No. 695,052. Patented Mar. 11, 1902.
C. E. HOLMES.
ADJUSTABLE PULLEY AND ADJUSTING MECHANISM THEREFOR.
(Application filed June 21, 1901.)
(No Model.) 3 Sheets—Sheet 1.
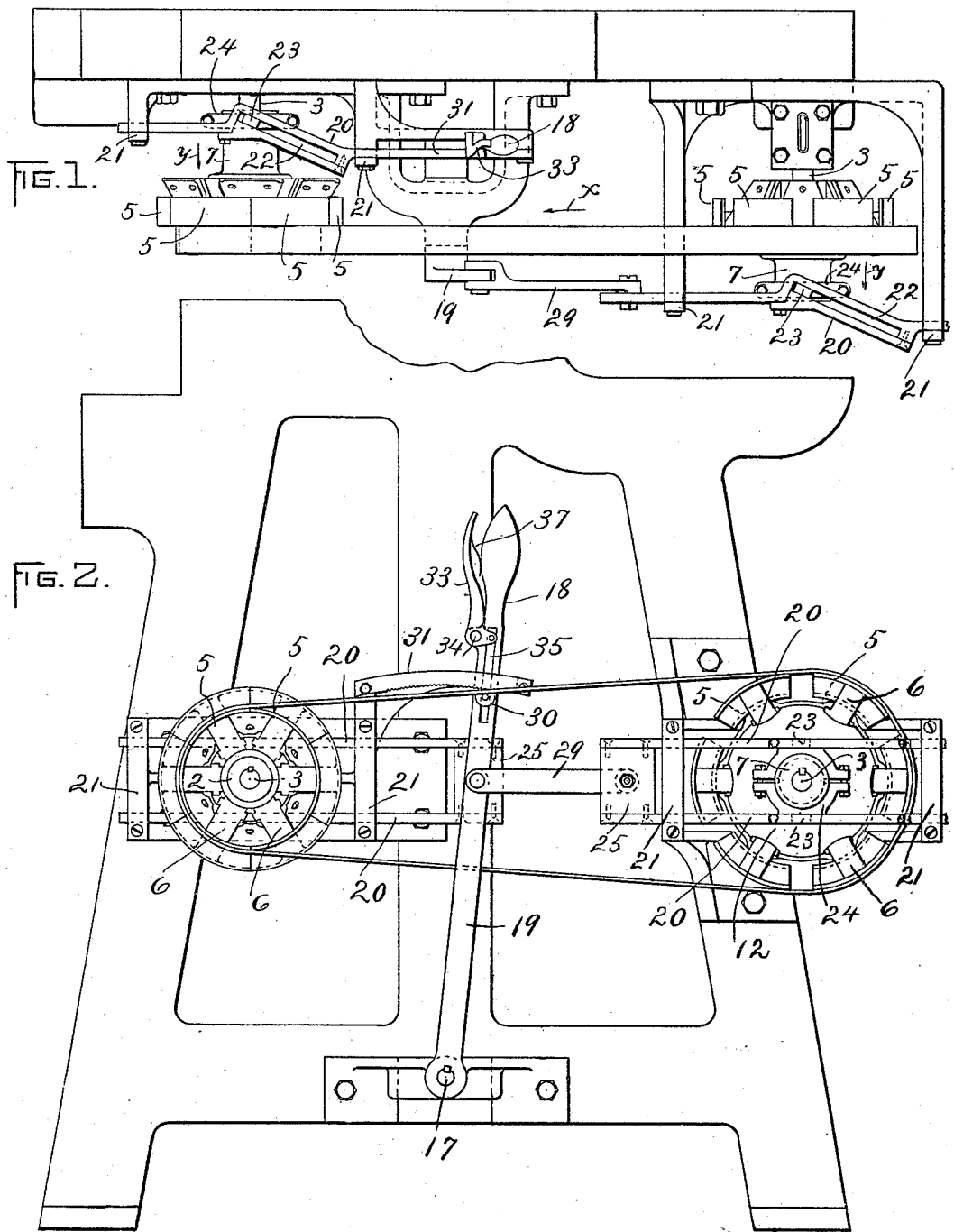

No. 695,052. Patented Mar. 11, 1902.
C. E. HOLMES.
ADJUSTABLE PULLEY AND ADJUSTING MECHANISM THEREFOR.
(Application filed June 21, 1901.)
(No Model.) 3 Sheets—Sheet 2.
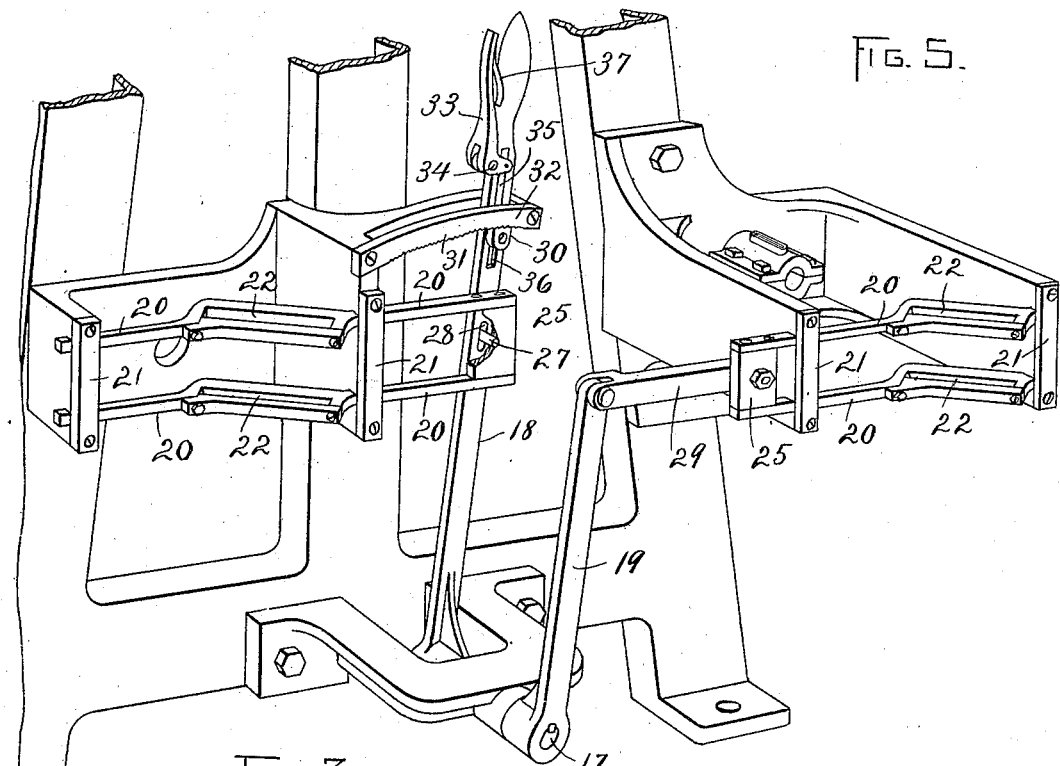
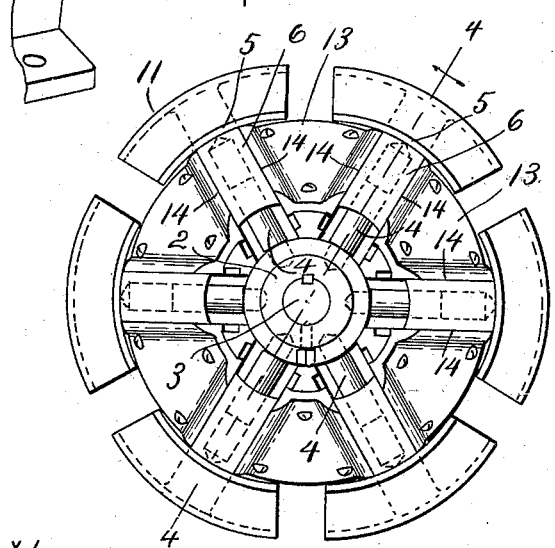
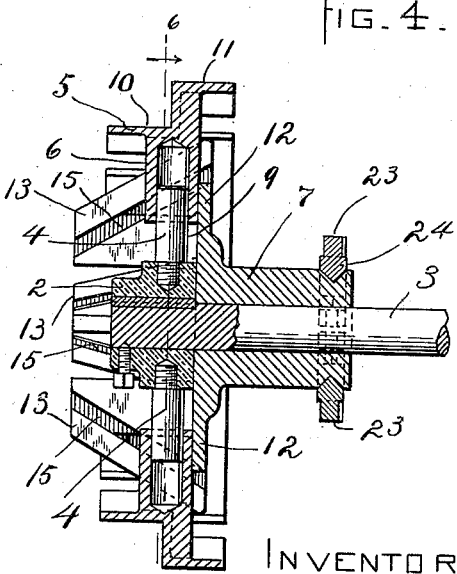
WITNESSES:
INVENTOR:
C. E. Holmes No. 695,052. Patented Mar. 11, 1902.
C. E. HOLMES.
ADJUSTABLE PULLEY AND ADJUSTING MECHANISM THEREFOR.
(Application filed June 21, 1901.)

(No Model.) 3 Sheets—Sheet 3.

WITNESSES:
A. D. Harrison
George Ozzetti

INVENTOR:
C. E. Holmes
by Wright Brown & Quinby
Attys.

UNITED STATES PATENT OFFICE.

CHARLES E. HOLMES, OF MELROSE, MASSACHUSETTS, ASSIGNOR OF ONE-HALF TO FREDERICK H. PAGE, OF MELROSE, MASSACHUSETTS.

ADJUSTABLE PULLEY AND ADJUSTING MECHANISM THEREFOR.

SPECIFICATION forming part of Letters Patent No. 695,052, dated March 11, 1902.

Application filed June 21, 1901. Serial No. 65,388. (No model.)

*To all whom it may concern:*

Be it known that I, CHARLES E. HOLMES, of Melrose, in the county of Middlesex and State of Massachusetts, have invented certain new and useful Improvements in Adjustable Pulleys and Adjusting Mechanism Therefor, of which the following is a specification.

This invention has for its object to provide a simple, strong, and effective adjustable pulley the diameter of which can be quickly increased or diminished.

The invention also has for its object to provide improved means for simultaneously adjusting two of said pulleys, one of which is driven from the other through a belt and for positively securing each pulley at any desired adjustment.

The invention consists in the improvements which I will now proceed to describe and claim.

Figure 7:
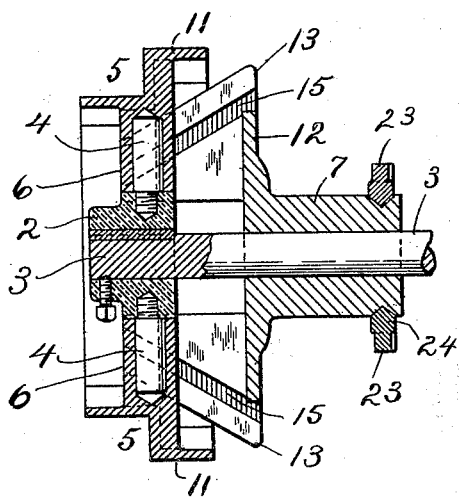
Figure 6:
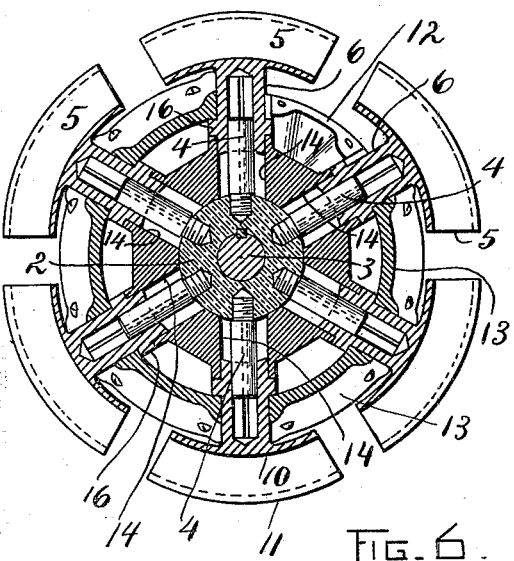
Figure 8:
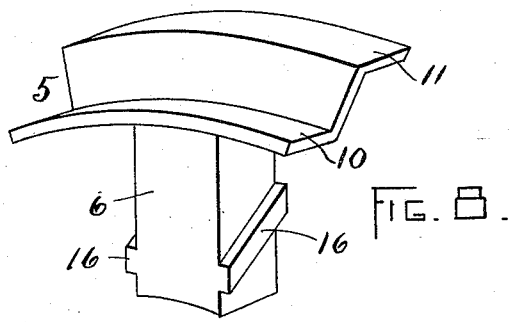

Of the accompanying drawings, forming a part of this specification, Figure 1 represents a top plan view showing two adjustable pulleys embodying my invention and mechanism for adjusting the same. Fig. 2 represents a side elevation of the parts shown in Fig. 1. Fig. 3 represents a side elevation of an adjustable pulley embodying my invention. Fig. 4 represents a section on line 4 4 of Fig. 3. Fig. 5 represents a perspective view of the pulley-adjusting mechanism shown in Figs. 1 and 2. Fig. 6 represents a section on line 6 6 of Fig. 4. Fig. 7 represents a section similar to Fig. 4, showing the pulley contracted. Fig. 8 represents a perspective view of one of the segments or sections of the pulley.

The same reference characters indicate the same parts in all the figures.

My improved pulley comprises a hub 2, rigidly affixed to the supporting-shaft 3 and provided with radial guides 4, pulley segments or sections 5, having shanks 6, adapted to slide radially upon the guides 4, and a collar 7, adapted to slide longitudinally on the shaft 3 and provided with guide members, hereinafter described, which are caused by the movements of the collar 7 upon the shaft to move the pulley-segments 5 radially toward or from the shaft, thus increasing or decreasing the diameter of the pulley.

The radial guides 4 are preferably cylindrical studs having a close sliding fit in cylindrical sockets formed in the shanks 6 of the pulley-segments, said shanks and guides being connected to prevent the shanks from turning on the guides by means of keys or feathers 9 on the guides entering grooves in the shanks 6. The segments 5 are here shown as each provided with two belt-supporting faces 10 and 11, located at different distances from the axis of the pulley. The collar 7 is provided with a flange 12, to which are affixed tapering blocks or projections which extend between the shanks 6 of the pulley-segments and have flat faces 14 in close sliding contact with the corresponding sides of the shanks 6. In the sides 14 of the projections 13 are formed inclined grooves 15, into which project inclined tongues 16 on the shanks 6. The said inclined grooves 15 and tongues 16 are arranged so that when the collar 7 is moved in one direction on the shaft the pulley-segments 5 will be moved radially outward, thus increasing the diameter of the pulley, and when the collar 7 is moved in the opposite direction the segments will be moved radially inward, thus decreasing the diameter of the pulley.

It will be seen that the shanks of the pulley-sections are internally supported by the radial guides 4 and externally supported by the flat sides 14 of the projections on the collar 7, as well as by the engagement of the tongues 16 with the walls of the grooves 15. Hence the segments 5 are firmly supported in any of their adjustments.

In Figs. 1, 2, and 5 I show means for simultaneously adjusting two pulleys of the above-described construction and for securely locking the pulley-adjusting collar 7 to maintain said adjustments. In Figs. 1 and 2 the two pulleys shown are reversely arranged on parallel shafts—that is to say, the adjusting-collar 7 of one pulley is at the outer side while the adjusting-collar of the other pulley is at the inner side—so that when the two collars are moved simultaneously in the same direction one pulley will be expanded and the other contracted.

The adjusting and locking mechanism in the embodiment of my invention here shown is constructed as follows: 17 represents a rock-shaft journaled in a suitable bearing on the frame in which the shafts 3 3 are journaled. 18 19 represent levers affixed to said rock-shaft. Said levers are connected with slides 20 20, which are movable crosswise of the axes of the shafts 3 3 in fixed guides 21. Said slides have oblique slots or guides 22, which receive projections 23 23, formed on a ring 24, loosely engaged with a groove in the collar 7. One of the slides 20 is connected with the lever 18 by means of a block 25, secured to said slide, and provided with a pin 27, which enters a slot 28 in the lever 18. The other slide 20 is connected with the lever 19 by means of a link 29 and a block 25.

It will be seen that when the slides are moved in the direction indicated by the arrow $x$ in Fig. 1 the collars 7 will be moved in the direction indicated by the arrows $y\ y$, so that one pulley will be expanded and the other at the same time contracted. To maintain the pulleys at any adjustment which may be thus imparted to them, I provide the lever 18 with a serrated locking-block 30, adapted to engage a serrated edge 31 of a fixed segmental locking-plate 32, said block 30 being held in engagement with the serrated edge 31 by means of a lever 33, pivoted at 34 to the lever 18 and having a shorter arm connected with the block 30 by a slide 35, movable in a slot 36 in the lever 18. The other arm of the lever 33 is pressed outwardly by a spring 37, which normally holds the block 30 in engagement with the serrated edge 31. The movement of the longer arm of the lever 33 toward the handle end of the lever 18 disengages the locking-block 30 from the edge 31.

It will be seen from the foregoing that provision is made for quickly and simultaneously adjusting the two pulleys, one being contracted while the other is enlarged, and that each pulley is securely held in its adjusted position.

It will be seen that the projections 13, with their inclined grooves 15, constitute a series of guides which are movable lengthwise of the shaft to vary the diameter of the pulley. I do not limit myself to the means here shown for connecting and moving said guides, and any other suitable means may be employed for this purpose without departing from the spirit of my invention.

I claim—

1. An adjustable pulley comprising a hub affixed to the shaft which supports the pulley, radial guides affixed to the hub, pulley-segments engaged with said radial guides and movable radially thereon to vary the diameter of the pulley, the pulley-sections being internally supported by said radial guides, and a collar adapted to slide on said shaft and provided with rigid guides engaged with external portions of the pulley-segments, and adapted to move said segments simultaneously toward or from the shaft.

2. An adjustable pulley comprising a hub affixed to the shaft which supports the pulley, radial guides affixed to the hub, pulley-segments having shanks engaged with said radial guides and movable thereon to vary the diameter of the pulley, the pulley-segments being internally supported by said radial guides, and a collar movable on the shaft and provided with rigid tapering projections extending between the shanks of the pulley-segments and externally supporting them, said projections and shanks having inclined guide members whereby the segments are moved radially when the collar is moved on the shaft.

3. The combination of two adjustable pulleys, supporting-shafts therefor, each pulley comprising a hub affixed to its shaft and provided with radial guides, pulley-segments movable radially on said guides whereby they are internally supported by said guides, and a collar movable on the shaft and provided with rigid means for imparting radial movement to said segments and for externally supporting them, and mechanism for simultaneously moving said collars to effect a simultaneous adjustment of said collars.

4. The combination of two adjustable pulleys, supporting-shafts therefor, each pulley comprising a hub affixed to its shaft and provided with radial guides, pulley-segments movable radially on said guides whereby they are internally supported by said guides, and a collar movable on the shaft and provided with rigid means for imparting radial movement to said segments and for externally supporting them, mechanism for simultaneously moving said collars to effect a simultaneous adjustment of said collars, and locking devices cooperating with said adjusting mechanism for maintaining any desired adjustment of said pulleys.

5. The combination of two adjustable pulleys, supporting-shafts therefor, each pulley comprising a hub affixed to its shaft and provided with radial guides, pulley-segments movable radially on said guides whereby they are internally supported by said guides, and a collar movable on the shaft and provided with rigid means for imparting radial movement to said segments and for externally supporting them, said pulleys being reversely arranged so that a movement of the collar of one pulley in a given direction causes an expanding movement while a movement of the collar of the other pulley in the same direction causes a contracting movement and means for simultaneously moving said collars.

6. The combination of two adjustable pulleys, supporting-shafts therefor, each pulley comprising a hub affixed to its shaft and provided with radial guides, pulley-segments movable radially on said guides whereby they are internally supported by said guides, and a collar movable on the shaft and provided with rigid means for imparting movement to said segments and for externally supporting them, slides movable in fixed guides crosswise of the axes of the pulleys and having oblique guides engaged with projections on said collars, and means for simultaneously moving said slides.

7. The combination of two adjustable pulleys, supporting-shafts therefor, each pulley comprising a hub affixed to its shaft and provided with radial guides, pulley-segments movable radially on said guides whereby they are internally supported by said guides, and a collar movable on the shaft and provided with rigid means for imparting radial movement to said segments and for externally supporting them, slides movable in fixed guides crosswise of the axes of the pulleys and having oblique guides engaged with projections on said collars, means for simultaneously moving said slides, and means for locking the slides in any position to which they may be moved.

In testimony whereof I have affixed my signature in presence of two witnesses.

CHARLES E. HOLMES.

Witnesses:
C. F. BROWN,
A. D. HARRISON.